Jan. 30, 1934.  F. KLOBOUČNIK  1,945,113
WINDOW SEAT
Filed July 27, 1933  3 Sheets-Sheet 1

Inventor:
Frank Kloboučnik
By: Frank J. Schraeder Jr.
Atty.

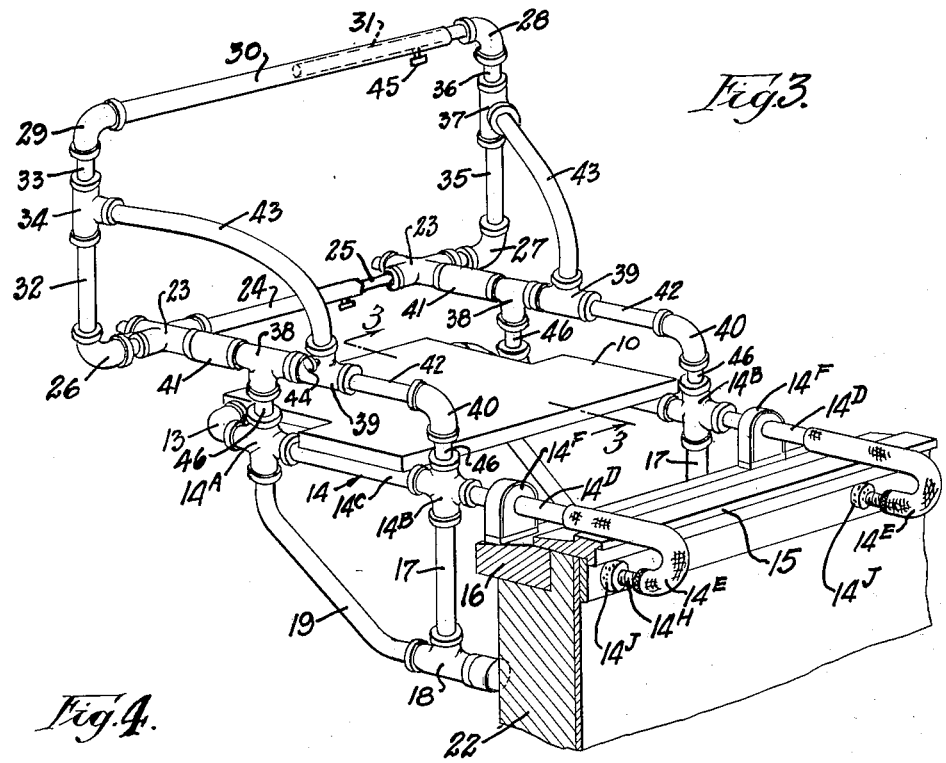
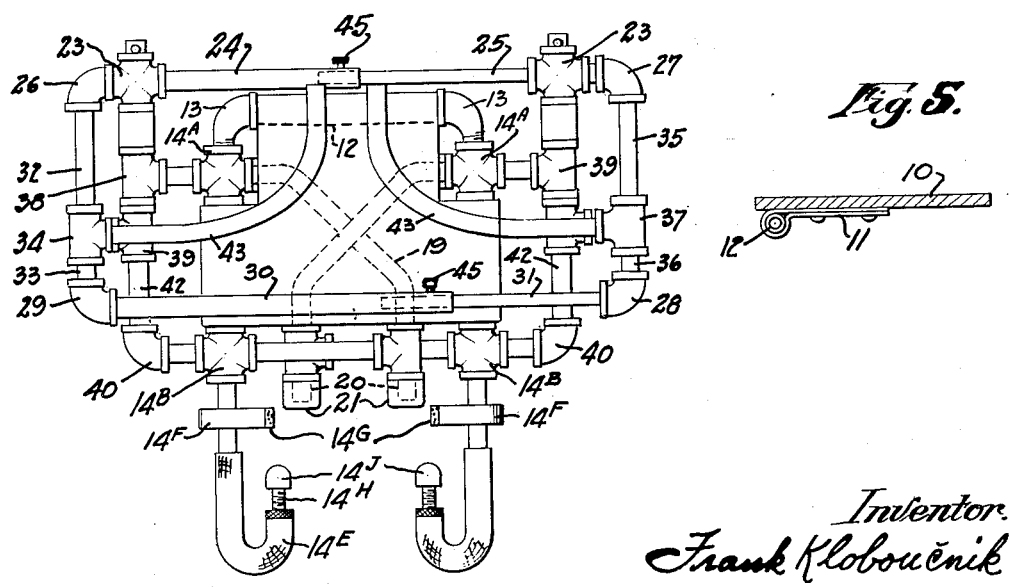

Jan. 30, 1934.     F. KLOBOUČNIK     1,945,113
WINDOW SEAT
Filed July 27, 1933     3 Sheets-Sheet 3

Inventor:
Frank Kloboučnik
By Frank Schraeder Jr
Atty.

Patented Jan. 30, 1934

1,945,113

UNITED STATES PATENT OFFICE 1,945,113

WINDOW SEAT

Frank Klcboučnik, Chicago, Ill.

Application July 27, 1933. Serial No. 682,395

1 Claim. (Cl. 304—27)

This invention relates to window seats. It has for its object to provide a window seat for washing the exterior of window panes and which may be readily set in position for use, and which is provided with means for cushioning the parts of the seat to prevent marring of the window casing and the outside of the building and which is formed of standard pipe fittings and parts.

While primarily designed for window cleaning, it will be obvious that the device may be employed for any other purposes wherein it is found to be applicable.

Other important objects of the invention are to provide a seat of the character described which may be readily attached in position to any window of the ordinary construction and arrangement, strong, durable and efficient in its use, and comparatively inexpensive to manufacture.

With the foregoing and other objects in view, which will appear as the description proceeds, the invention resides in the novel combination and arrangement of the parts and in the details of construction hereinafter described and claimed, it being understood that changes in the precise embodiment of the invention herein disclosed can be made within the scope of the claim hereunto appended without departing from the spirit of the invention.

In the drawings wherein like numerals of reference designate corresponding parts throughout the several views:

Fig. 3 is a perspective view of a modified form of my invention;

Fig. 4 is a view of same in collapsed position;

Fig. 5 is a cross-section of the seat shown in Figs. 3 and 4.

Figure 1:
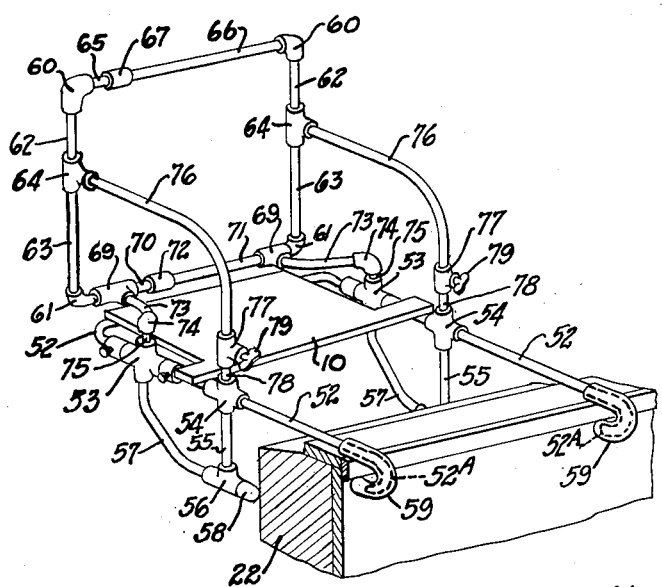
Fig. 1 is a perspective view of a window seat showing an embodiment of a preferred form of my invention.
Figure 2:
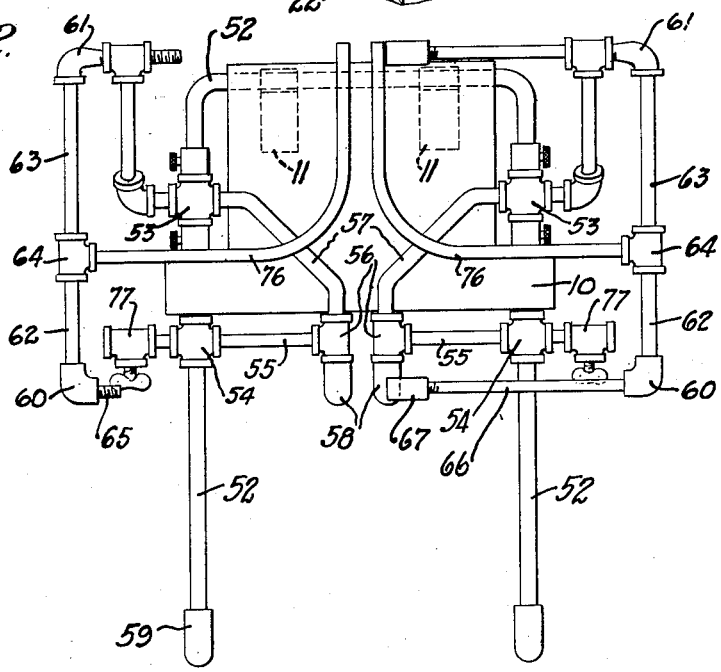
Fig. 2 is a view of same in collapsed position.

Referring to the illustrations shown in Figs. 1 and 2, the seat is indicated by numeral 10 and is pivotally mounted by strap hinges 11 on the seat supporting pipe 52 which is bent into a general U-shape form with the ends thereof bent to form hook-ends 52$^A$ which are covered with a rubber tube 59. The pipe 52 is one continuous pipe and extends slidably through the two sets of crosses 53 and 54 which form parts of a bracket which affords a wall brace for the seat.

The wall brackets or braces consist of vertical pipe members 55 which extend downwardly from the crosses 54 into T's 56 and diagonally disposed brace pipes 57 which interconnect the crosses 53 and T's 56. Short nipples with rubber caps 58 form cushioned bearings for the braces against the outside of the building wall 22.

A safety back railing is also provided which consists of the upper L fittings 60 and the lower L fittings 61 which are interconnected by vertically disposed pipe members 62 and 63. A T 64 is interposed between the pipe members 62 and 63.

The upper lateral member of the back railing consists of short pipe member 65 and a longer pipe member 66 which is connected to the L's 60 at one end and at the other ends connected to their coupling member 67.

The lower lateral member of the back railing consists of a pair of T fittings 69 connected to the L's 61 and interconnected by a pair of pipe members 70 and 71 coupled together by the coupling 72.

The lower lateral member is supported from the crosses 53 on bent pipes 73 which extend from T's 69 to the L fittings 74 which are connected to the crosses 53 by nipples 75.

The couplings 67 and 72 permit the upper and lower lateral pipe members to be uncoupled to afford the structure to be collapsed for convenient shipment or storage purposes as shown in Fig. 2.

The side railings consist of bent pipes 76 which extend at one end from the T fittings 64 and are adapted for slidable insertion of their opposite ends into T fittings 77 which are rigidly connected by means of nipples 78 to the crosses 54.

Referring to the modification shown in Figs. 3 to 5 inclusive, 10 indicates a seat preferably of wood which is pivotally mounted by strap hinges 11 on the seat-supporting hinge pipe 12 which is provided with elbows 13 at its ends which elbows are connected to the crosses 14$^A$.

The crosses 14$^A$ form pivotal ends on the elbows 13 for the seat cross-supports which are generally indicated by numeral 14 and which cross-supports comprise the end crosses 14$^A$, intermediate crosses 14$^B$, connecting pipes 14$^C$ and hooked supporting pipes 14$^D$. The hooked supporting pipes 14$^D$ are covered at their hooked ends with rubber tubing 14$^E$ for cushioning the supports against the window sill 15. The hooked pipes 14$^D$ are also each provided with slidable supports 14$^F$ to support the cross-support 14 on the wall window sill 16 and the supports 14$^F$ have rubber cushions 14^G for cushioning and frictional purposes.

To accommodate varying widths of the sills 15, the hooked ends of the pipes 14^D are provided with adjustable studs 14^H screwed therein and each provided with a rubber bearing cap 14^J.

The crosses 14^A and 14^B also form parts of triangular-like wall braces which consist of the vertical pipe members 17 extending downwardly from the crosses 14^B into T's 18 and diagonally disposed brace pipes 19 interconnecting the cross 14^A and T 18. Short nipples 20 with rubber caps 21 form bearings for the seat braces against the building wall 22.

My improved window seat also embodies safety side railing and a back rest.

The back rest comprises a pair of cross or T pipe fittings 23 interconnected with a pair of telescopically mounted pipes 24 and 25 and elbows 26, 27, 28 and 29.

The elbows 28 and 29 are interconnected with telescopically mounted pipes 30 and 31.

The elbows 26 and 29 are connected with a pair of pipe sections 32 and 33 and a T 34. Likewise, the elbows 27 and 28 are connected with a pair of pipe sections 35 and 36 and a T 37.

The side railings each consist of a pair of T's 38 and 39 and end elbows 40. A short pipe 41 connects the cross or T 23 with the T 38 and a short pipe 42 connects the T 39 with the elbow 40.

A brace is provided for the back which consists of a pair of bent pipe sections 43, one connected at one end to the T 34 and the other to the T 37 and said brace pipes being adapted to engage with their opposite ends within the T 39 and retained therein by suitable cap screws 44.

Retaining cap screws 45 are also provided for the telescoping pipe members of the back rest.

It will be noted that in collapsing the seat into the position shown in Fig. 4, that the cap screws 45 are first loosened, likewise, cap screws 44 to permit the withdrawal of the braces 43 out of the T's 39 to afford a longitudinal movement of the sides of the back rest and lengthening of the telescoping parts as the braces 19 are swung inwardly toward each other into over-lapping position about the axes comprising the supporting cross member 14.

Figure 6:
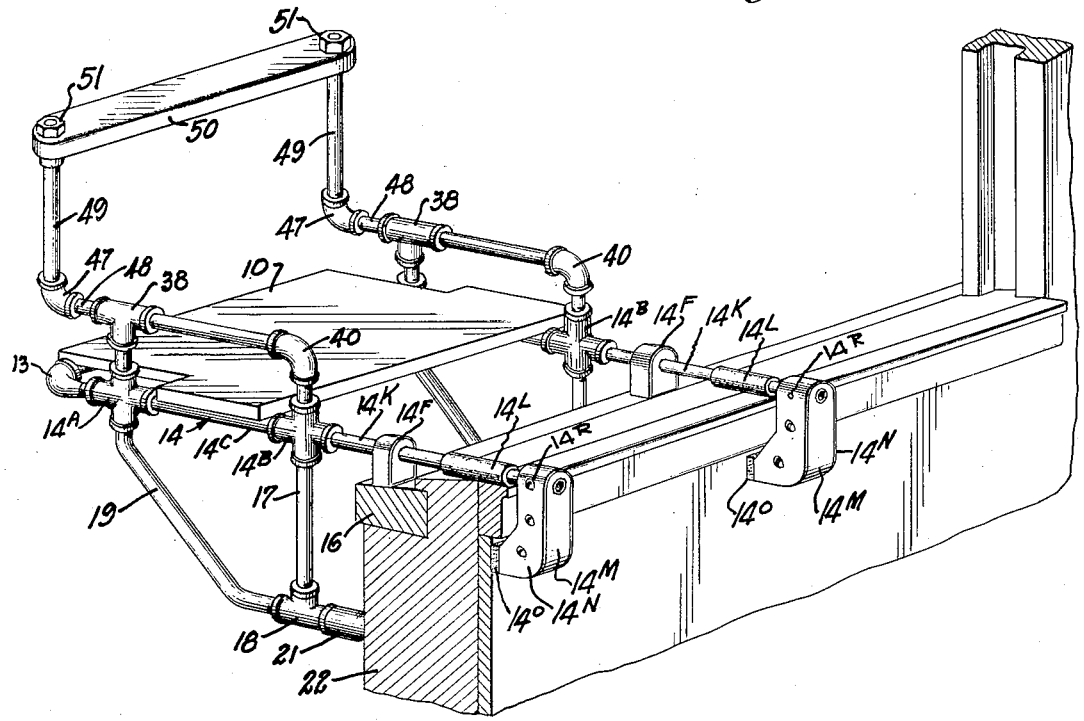
Fig. 6 is a perspective view of a modified form of my improved seat.
Figure 7:
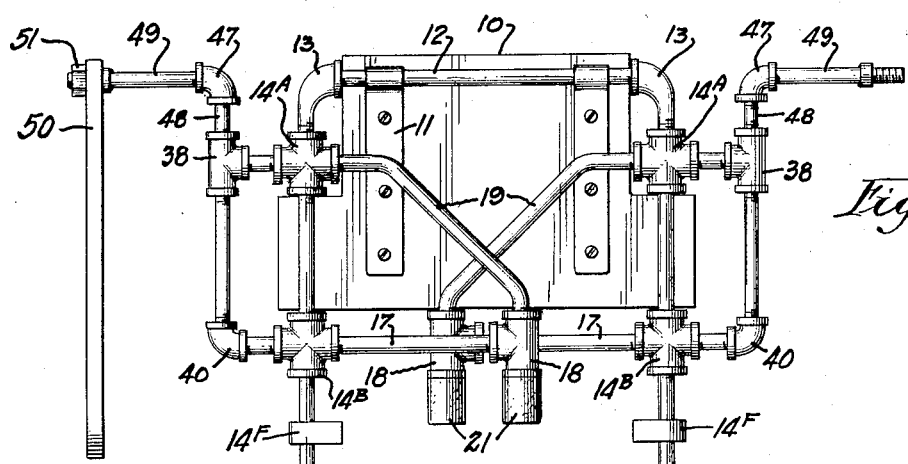
Fig. 7 is a view of the modified form of the seat in collapsed position.

Since the modification shown in Figs. 6 and 7 is similar to that above-described shown in Figs. 3 to 5, inclusive, I will therefore describe the features which are different in construction and arrangement and where the parts or members are similar or alike they will bear corresponding numerals.

Referring now to Figs. 6 and 7, the back rest in this instance is simplified and consists of a pair of L's 47 connected by nipples 48 to the T's 38 and having upright pipe members 49 screwed thereon.

The opposite ends of the pipes 49 are cross connected by a member 50 which is retained thereon by nuts 51.

The design shown in Figs. 6 and 7 also differs from my preferred design above-described.

The horizontal members 14^K are straight pipes with cushioning rubber sleeves 14^L and at their slidably adjustable bearing blocks 14^M made of wood and embraced by U-shaped metal covers 14^N secured with screws to the wooden blocks 14^M. The pipes 14^K are provided with a plurality of holes for the retaining bolts 14^R and each bearing block 14^M is provided with a rubber cushion 14^O.

From the above it will be readily apparent that I have provided a simple and efficient window seat made substantially of standard pipe members and one which is also readily collapsible into folded position for transportation or storage purposes.

I claim:

A window seat formed of standard pipe fittings and comprising in combination, a single continuous seat-supporting pipe having a pair of intermediate portions bent substantially right-angularly and the ends of said pipe being bent hook-like, a pair of cross-fittings mounted on said seat-supporting pipe between each of said right-angularly bent portions and the hook-like ends, a pair of pipes extending from the lower ends of said cross-fittings into a common T-fitting to form wall braces for said seat-suporting pipe, a substantially rectangular back-rest formed of pipe-fittings and supported on a pair of said cross-fittings, the two horizontal members of said back-rest being formed of a pair of pipes and a coupling member to permit uncoupling of same to afford the collapsing of the device, and a pair of side guards each comprising an L-shaped pipe having one end connected to a vertical member of said back-rest and the other end thereof removably connected to one of said cross-fittings.

FRANK KLOBOUČNIK.